United States Patent [19]
Spears

[11] Patent Number: 5,288,538
[45] Date of Patent: Feb. 22, 1994

[54] EXPANDABLE HONEYCOMB CORE STRUCTURAL MEMBER

[75] Inventor: Robert P. Spears, Richmond, Va.

[73] Assignee: Reynolds Metals Company, Richmond, Va.

[21] Appl. No.: 992,271

[22] Filed: Dec. 16, 1992

[51] Int. Cl.$^5$ .............................................. B32B 9/00
[52] U.S. Cl. ...................................... 428/116; 428/117; 428/188; 428/120; 428/159; 428/198; 156/60; 156/79
[58] Field of Search ............... 428/161, 117, 116, 135, 428/137, 256, 159, 120, 192, 188; 156/79, 197

[56] References Cited

U.S. PATENT DOCUMENTS

| | | | |
|---|---|---|---|
| 2,608,502 | 8/1952 | Merriman | 428/188 |
| 2,744,042 | 5/1956 | Pace | 154/75 |
| 2,973,295 | 2/1961 | Rodgers, Jr. | 154/100 |
| 3,170,471 | 2/1965 | Schnitzer | 428/116 |
| 3,526,556 | 9/1970 | Berner | 156/79 |
| 3,614,848 | 10/1971 | Hitch | 428/120 |
| 3,615,974 | 10/1971 | Graff | 156/79 |
| 3,616,158 | 10/1971 | Rubens | 428/159 |
| 3,644,158 | 2/1972 | Strumbos | 428/117 |
| 3,834,962 | 9/1974 | Strumbos | 156/79 |
| 4,025,681 | 5/1977 | Donnelly et al. | 428/116 |
| 4,297,154 | 10/1981 | Keller | 156/79 |
| 4,602,466 | 7/1986 | Larson | 428/192 |
| 4,885,190 | 12/1989 | Schnebly | 427/207.1 |

Primary Examiner—Patrick J. Ryan
Assistant Examiner—Abraham Bahta
Attorney, Agent, or Firm—Robert C. Lyne, Jr.

[57] ABSTRACT

An expandable structural member comprises two outer skin members, a plastically deformable reinforcing layer arranged between the two outer skin members, and a foamable polymer composition coated on at least one of each adjacent surface of the reinforcing layer and the respective outer skin member. Each adjacent surface of the reinforcing layer and the respective outer skin member contact one another and are intermittently bonded to one another, with the intermittent bonds on one surface of the reinforcing layer being non-aligned with the intermittent bonds on the other surface of the reinforcing layer. Additionally, the foamable polymer composition is foamable by application of heat to the structural member, whereby the foamed polymer resulting from application of heat to the structural member expands the outer skin members from contact with the reinforcing layer at non-bonded areas and plastically deforms the reinforcing layer into a three-dimensional reinforcing configuration.

37 Claims, 4 Drawing Sheets

EXPANDABLE HONEYCOMB CORE STRUCTURAL MEMBER

FIELD OF THE INVENTION

The present invention relates to an expandable honeycomb core structural member which may be continuously formed and easily handled as a thin sheet and later expanded into a structural member of high specific stiffness.

BACKGROUND OF THE INVENTION

Honeycomb core structural members such as panels and the like generally comprise two rigid outer skin members, often formed of metal sheet, bonded to opposite surfaces of a core. The core comprises rigid walls forming a number of compartments or cells between the outer skin members. The cells often resemble a honeycomb structure. Honeycomb core panels having large bending loads have been formed using the high moment of inertia afforded by the separation of the panels' outer skin members. Under bending loads, the relatively light weight core maintains the outer skin member spacing and carries relatively small shear stresses while the outer skin members bear the relatively large tensile and compressive stresses. The honeycomb core structural members therefore concentrate material where stresses are high and minimize material where the stresses are low, thus yielding a very high specific stiffness. This high specific stiffness renders the honeycomb core structural members particularly advantageous for use in applications that require both low weight and high stiffness constraints. Many uses for honeycomb core panels and other honeycomb structural members have been in transportation, particularly aerospace applications, and in other environments where there is an economic premium in weight reduction.

The use of honeycomb core structural members in various additional applications has been limited by the high cost of the honeycomb core structural member formation. That is, it is difficult to form the honeycomb core structural members into formed articles without damaging the structural member once the core is bonded to the outer skin members. Accordingly, many honeycomb core structural members must be custom made in batch processes in order to meet final design criteria. While continuous processing reduces the costs of manufacturing honeycomb core structural members, continuous processing limits the utility of the members to applications where no post forming of the structural members into shaped articles is required.

Thus, a need exists for honeycomb core structural members which may be formed to meet various shaped article design criteria and which may also be formed in a continuous processing method.

SUMMARY OF THE INVENTION

Accordingly, it is an object of the present invention to provide novel honeycomb core structural members. It is a related object of the invention to provide honeycomb core structural members which may be formed using a continuous processing method. It is a further object of the invention to provide honeycomb core structural members which may be formed and shaped to meet various shaped article design criteria. More specifically, it is an object of the present invention to provide a honeycomb core structural member which may be continuously formed in a collapsed thin sheet configuration, handled and transported in the thin sheet configuration and then subsequently expanded into a honeycomb panel or formed into a shaped article and then expanded into a honeycomb structure of high specific stiffness after its final shape has been achieved.

These and additional objects are provided by the expandable structural member of the present invention. More specifically, the expandable structural member comprises two outer skin members, a plastically deformable reinforcing layer and a foamable polymer composition. The plastically deformable reinforcing layer is arranged between the two outer skin members, and each adjacent surface of the reinforcing layer and the respective outer skin member contact one another and are intermittently bonded to one another. The intermittent bonds on one surface of the reinforcing layer are non-aligned with or are discontinuous with the intermittent bonds on the other surface of the reinforcing layer. Additionally, the foamable polymer composition is coated on at least one of each adjacent surface of the reinforcing layer and the respective outer skin member. The foamable polymer composition is foamable by application of heat to the structural member, and the foamed polymer which results from such application of heat expands the outer skin members from contact with the reinforcing layer at non-bonded areas and plastically deforms the reinforcing layer into a three dimensional reinforcing configuration.

The expandable structural members according to the present invention are advantageous in that they may be formed as a thin sheet in a continuous processing method. Additionally, the thin sheets may be easily handled and transported and then shaped to meet various design criteria prior to expansion by foaming the polymer composition. Thus, the expandable structural members of the present invention overcome many disadvantages of prior art honeycomb core panels in providing relatively low cost, versatile honeycomb structural members.

These and additional objects and advantages will be more fully apparent in view of the following detailed description.

BRIEF DESCRIPTION OF THE DRAWING

The detailed description will be more fully understood when viewed together with the drawing in which.

DETAILED DESCRIPTION

The expandable structural member of the present invention comprises two outer skin members, a plastically deformable reinforcing layer arranged between the two outer skin members and a foamable polymer composition coated on at least one of each adjacent surface of the reinforcing layer and the respective outer skin member. Each adjacent surface of the reinforcing layer and the respective outer skin member contact one another and are intermittently bonded to one another, with the intermittent bonds on one surface of the reinforcing layer being non-aligned with the intermittent bonds on the other surface of the reinforcing layer. The foamable polymer composition is foamable by application of heat to the structural member, and the resultant foamed polymer expands the outer skin members from contact with the reinforcing layer and non-bonded areas, thereby plastically deforming the reinforcing layer into a three dimensional reinforcing configuration.

Figure 1:
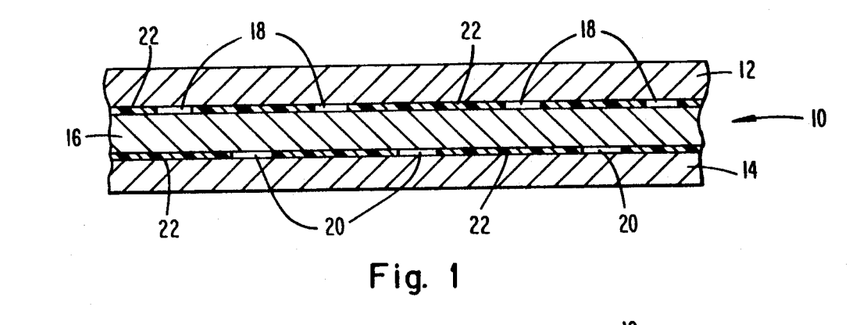
FIG. 1 is a partial cross sectional view of one embodiment of the expandable structural member of the present invention.

One embodiment of the expandable structural member according to the present invention is set forth in FIG. 1. Reference numeral 10 designates the expandable structural member which is in the form of a thin sheet prior to expansion of the member. The thickness of the expandable structural member will be dependent on the specific application of the structural member in its expanded form. In a preferred embodiment, the expandable structural member has a thickness of from about 0.02 to about 0.10 inches and may be expanded to form a structural member having a thickness of from about 0.10 to about 0.50 inches. The structural member includes two outer skin members 12 and 14, respectively. In the embodiment of FIG. 1, the outer skin members are formed of metal. For example, the outer skin members may be formed of aluminum or an aluminum alloy. In an alternate embodiment, the outer skin members may be formed of a polymer, for example of a single specialty polymer or a blend of specialty polymers.

In the structural member 10 shown in FIG. 1, the reinforcing layer is designated by reference numeral 16. In the embodiment of FIG. 1, the reinforcing layer 16 is shown as a continuous planar sheet formed of a metal. The reinforcing layer may be formed of an aluminum alloy or the like, or a polymer, for example a polyalkylene terephthalate. Additionally, the reinforcing layer may be formed in a grid structure rather than a continuous sheet, as will be described in further detail below. Each adjacent surface of the reinforcing layer and the respective outer skin member contact one another and are intermittently bonded to one another. For example, as shown in FIG. 1, the adjacent surface of the reinforcing layer 16 and the outer skin member 12 are intermittently bonded to one another at bonded areas 18. Similarly, the other surface of the reinforcing layer 16 and the adjacent surface of the outer skin member 14 are intermittently bonded to one another at bonded areas 20. The bonded areas 18 with respect to the outer skin member 12 are non-aligned with or are discontinuous with the bonded areas 20 with respect to the outer skin member 14. Finally, a foamable polymer composition 22 is coated on at least one of each adjacent surface of the reinforcing layer and the respective outer skin members 12, 14.

The foamable polymer composition is foamable by application of heat to the structural member. The foamable polymer composition includes a foamable polymer and a heat-activated foaming agent for the polymer. As will be apparent to one of ordinary skill in the art, essentially any plastic polymer can be foamed and is therefore suitable for use in the present invention. Thermoplastic polymers which are routinely foamed by the application of heat and which are suitable for use in the present invention include unsaturated polyesters, polyolefins, for example, polyethylene and polypropylene, polyvinylchlorides, polyalkylene terephthalates, for example polyethylene terephthalate, polyphenylene ethers and polystyrenes. Also suitable for use in the foamable composition are foamable thermosetting polymers including polyurethanes and polyesters.

Heat activated foaming agents for use in the foamable polymer composition are also well known in the art for use with the above-mentioned polymers. Generally, the choice of the heat-activated foaming agent will be dependent on the particular polymer to be foamed and on the desired activation temperature for the foaming action. For a thermoplastic or thermosetting polymer having a relatively low processing temperature, a suitable foaming agent is azodicarbonamide. When a higher activation temperature is required for the foaming action, another well known foaming agent comprising toluene sulfonyl semicarbizide may be used.

If crosslinking is desired, a suitable crosslinking agent may be included in the foamable polymer composition. Crosslinking agents are well known in the art and the use of a particular crosslinking agent will be dependent on the polymer employed and the desired processing temperatures. As is well known in the art, a polymer may be crosslinked either by heating (generally referred to as a one part crosslinking system) or by chemical addition of a crosslinking promoter (generally referred to as a two-part system). In either case, the crosslinking reaction is initiated by the decomposition of a crosslinking agent, often an organic peroxide. In one-part systems, the peroxide thermally decomposes when heated above a critical temperature. In the two-part system, the decomposition is initiated by addition of the chemical crosslinking promoter which causes decomposition of the peroxide. For example, polyethylene is commonly crosslinked by the decomposition of a peroxide such as dicumyl peroxide. Unsaturated polyesters are often crosslinked by the decomposition of a peroxide such as benzoyl peroxide or methyl ethyl ketone peroxide with a crosslinking promoter such as diethylaniline, dimethylaniline or cobalt octoate. These and additional crosslinking systems are well known in the art.

The foamable polymer composition is coated on at least one of each adjacent surface of the reinforcing layer and the respective outer skin member. Additionally, as noted above, each surface of the reinforcing layer and the respective outer skin member contact one another and are intermittently bonded to one another. Several means are available for bonding the reinforcing layer with the respective outer skin members. For example, a separate adhesive system may be used to form the intermittent bonded areas 18 and 20 as set forth in FIG. 1. If a separate adhesive system is used, it is necessary that the system is curable at a temperature below the polymer foaming temperature and is curable without exposure to air. It is also necessary that the adhesive system provide adequate bond strength between the reinforcing layer and the respective outer skin members. It will be apparent to one of ordinary skill in the art that a wide variety of structural adhesives meeting these requirements are suitable for use in the expandable structural member of the invention. Examples of adhesive systems include two-part epoxy adhesive systems, two-part acrylic adhesive systems and urethane adhesive systems, among others.

In an alternate embodiment, the bonded areas may be formed by selective curing of the foamable polymer composition. For example, a crosslinking agent can be included in the foamable polymer composition and selectively activated at areas of the respective outer skin members where the intermittent bonded areas are desired. For example, the foamable polymer composition may comprise an unsaturated polyester mixed with an azodicarbonamide foaming agent and a benzoyl peroxide crosslinking agent. A chemical crosslinking promoter could be selectively applied to the adjacent surface of the respective outer skin member or the reinforcing layer at the areas where the bonds are desired. Thus, in one embodiment, the foamable polymer composition containing the polymer, the foaming agent and the crosslinking agent may be coated on each outer skin member while the promoter is selectively applied at desired bonding areas on each surface of the reinforcing layer. In an alternate embodiment, the foamable polymer composition may be coated on the reinforcing layer and the promoter may be selectively applied at desired bonding areas on the outer skin members. Finally, both the foamable polymer composition and the promoter may be coated on the same surface of either the reinforcing layer or the outer skin member in a sequential coating process. When the reinforcing layer and the outer skin members are assembled to form the expandable structural member, the promoter crosslinks the polymer in the selected areas, thereby forming the skin to reinforcing layer intermittent bonds. Since the structural member is not heated during this step, no foaming or heat-induced crosslinking occurs.

It is an important feature of the invention that the reinforcing layer in the expandable structural member is plastically deformable. As a result, when the foamable polymer composition is heated to a temperature sufficient to activate the foaming agent, causing the polymer to foam, gas generated in the foaming action raises the internal pressure of the structural member and forces the outer skin members to separate from one another. As a result, the reinforcing layer plastically deforms into a three dimensional reinforcing configuration. Thus, the reinforcing layer must be formed of a material which will sustain the required elongation during the foaming/expansion step. Additionally, the bonds between the reinforcing layer and the respective outer skin members must have a peel resistance exceeding the force required for plastic deformation of the reinforcing layer in order for the respective outer skin members to remain intermittently bonded to the reinforcing layer when the structural member is expanded by the polymer foaming action. The foamed polymer surrounds the truss-like deformed reinforcing layer and assists in preventing buckling of the expanded member when compressive loads are applied. Depending on the density and mechanical properties of the foamed polymer, the foamed polymer may also aid in improving the resistance of the outer skin members to denting by serving as an internal support for the skin members.

Figure 2:
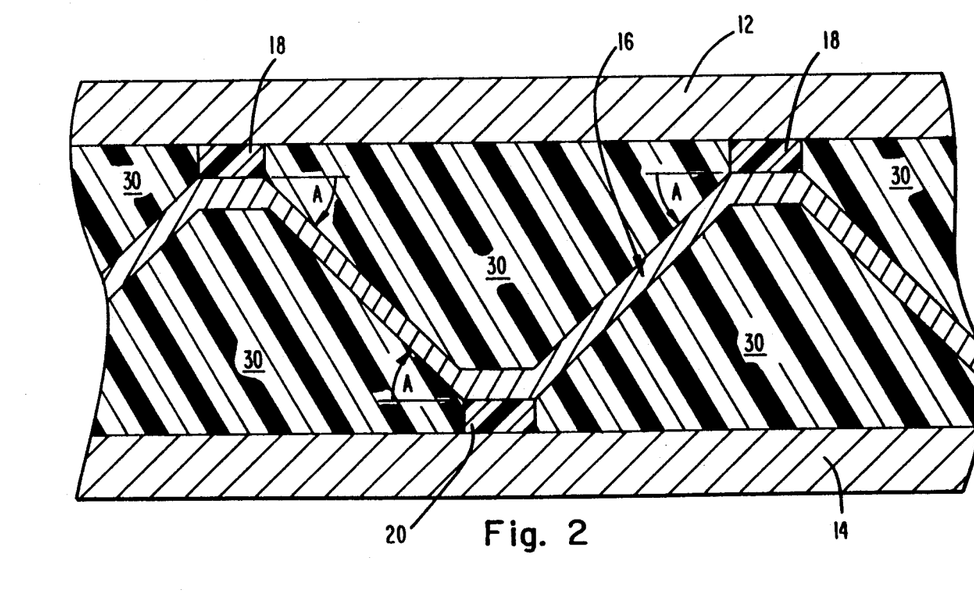
FIG. 2 is a partial cross sectional view of one embodiment of the structural member of the invention in an expanded configuration.

A partial cross section of an embodiment of the structural member in an expanded configuration is set forth in FIG. 2. With reference to FIG. 2, outer skin members 12 and 14 are expanded away from one another as compared with the embodiment shown in FIG. 1. This expansion is caused by foaming of the foamable polymer composition. The foamed polymer is located in areas 30 and surrounds the plastically deformed reinforcing layer 16. In accordance with FIG. 1, the reinforcing layer 16 is bonded to the outer skin member 12 at bonded areas 18 and the reinforcing layer 16 is bonded to the outer skin member 14 at bonded areas 20. In the embodiment of FIG. 2, the reinforcing layer 16 is plastically deformed to an angle of approximately 45° with respect to the outer skin members as shown by arrows A. This is an optimum configuration for carrying bending shear loads and requires that the reinforcing layer sustain an elongation of approximately 40 percent without tensile failure during the polymer foaming/structural member expansion step. Elongations of approximately 40 percent or more are obtainable with various materials including aluminum alloys, for example the O-temper 1200 series aluminum alloys containing at last 99 percent aluminum, and various polymers, for example, polyalkylene terephthalates.

Figure 3:
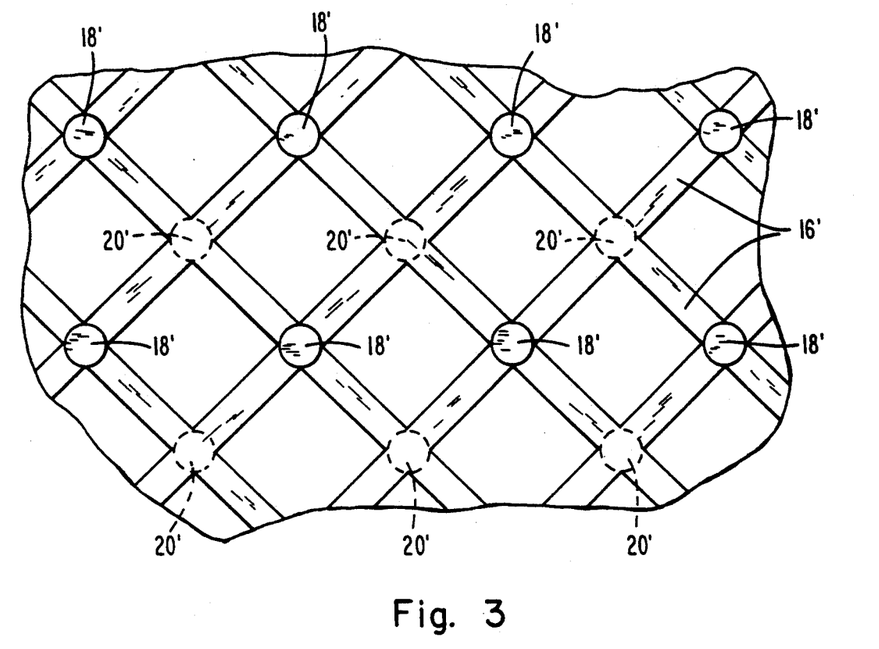
FIG. 3 shows a top view of a portion of the plastically deformable reinforcing layer in the form of a grid pattern.
Figure 4:
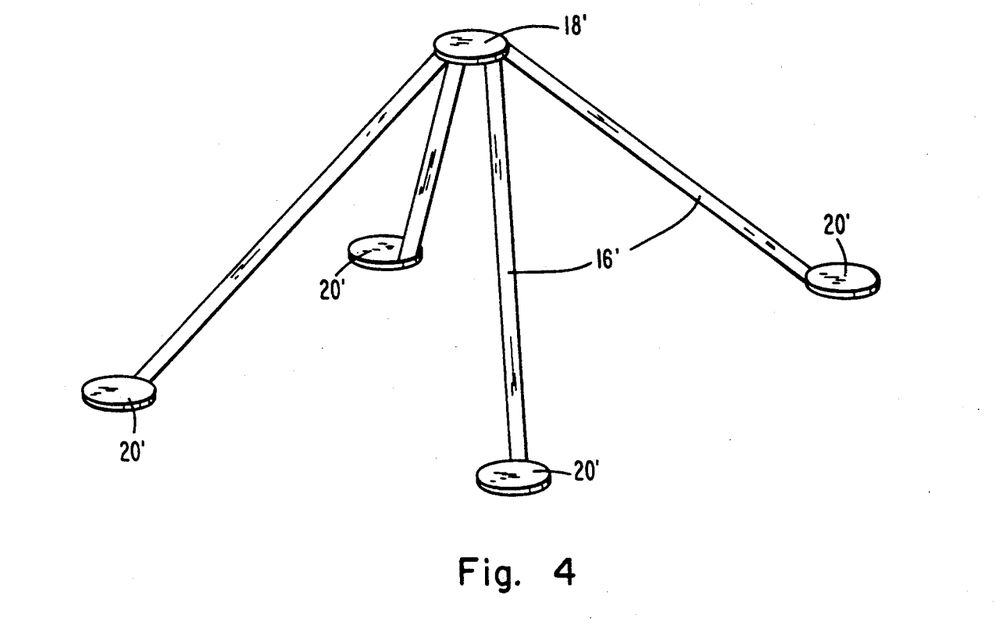
FIG. 4 is a schematic perspective view of a portion of the grid pattern reinforcing layer of FIG. 3 in an expanded configuration.

As set forth above, the reinforcing layer of the expandable structural member may comprise a continuous sheet or may be in the form of a grid pattern wherein intersecting points of the grid pattern are bonded to an adjacent surface of one of the outer skin members. A top view of one embodiment of a reinforcing layer in the form of a grid pattern is set forth in FIG. 3. With reference to FIG. 3, the grid pattern reinforcing layer 16' is a square grid that will form a pentahedral (five-sided) three-dimensional truss structure as shown in FIG. 4 when the foamed polymer expands the outer skin members from contact with the reinforcing layer at non-bonded areas and plastically deforms the reinforcing layer into the reinforcing configuration. The areas where the reinforcing layer 16' is bonded with the top outer skin member of the structural member are indicated by 18, while the areas at which the reinforcing layer 16' is bonded with the lower outer skin member are indicated at 20'. It is apparent from FIG. 3 that the areas 18' are non-aligned with the areas 20'.

While the reinforcing layer shown in FIGS. 3 and 4 forms a five-sided three-dimensional reinforcing configuration, it will be apparent to one of ordinary skill in the art that the grid pattern can be designed to form four-sided, six-sided or greater truss structures when plastically deformed by the foamed polymer. In a preferred embodiment, the reinforcing layer comprises a grid pattern forming a four-sided or a five-sided three-dimensional truss structure when plastically deformed by the foamed polymer.

Figure 5:
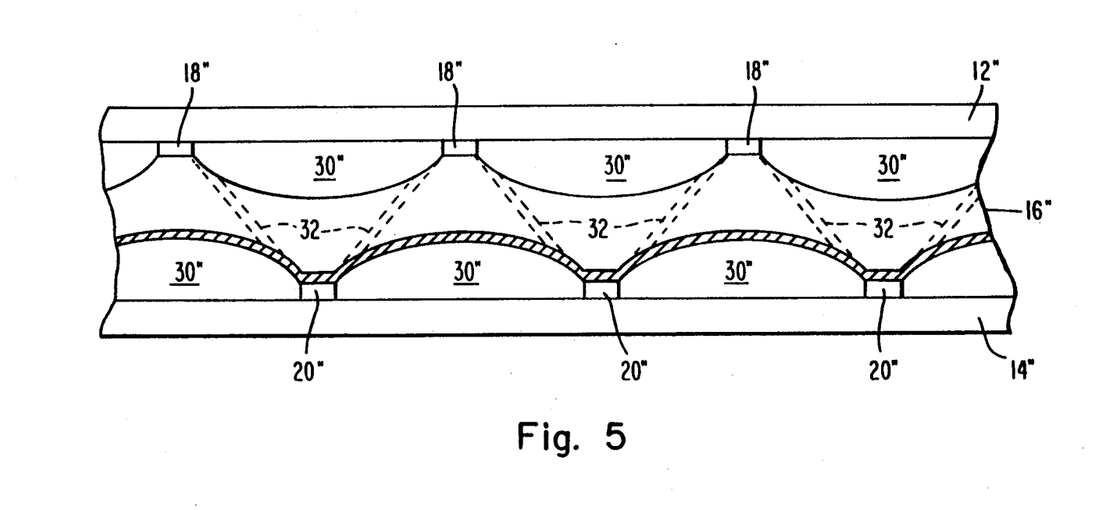
FIG. 5 is a schematic three-dimensional, partial cross sectional view of second embodiment of the structural member of the present invention in an expanded configuration.

FIG. 5 shows a schematic three-dimensional partial cross-sectional view of an expanded structural member according to the present invention wherein the reinforcing layer comprises a continuous sheet. As further shown in FIG. 5, the expanded structural member includes the outer skin members 12" and 14", the continuous sheet reinforcing layer 16" bonded to the outer skin members at bonded areas 18" and 20", respectively, and foamed polymer which fills areas 30" between the reinforcing layer and the outer skin members. As further shown in FIG. 5, the plastically deformed reinforcing layer 16″ is formed into a saddle-like structure between adjacent bonded areas on the respective outer skin members. However, the truss elements between adjacent opposite skin bonds are contained within the reinforcing layer as shown in phantom and indicated at 32 in FIG. 5. Thus, the structure of the reinforcing layer in the embodiment of FIG. 5 is at least equivalent in load-bearing capabilities to the grid pattern reinforcing layer shown in FIGS. 3 and 4. Although the continuous sheet reinforcing layer of FIG. 5 has a higher material requirement, a compensating advantage for use of the continuous sheet reinforcing layer embodiment is that it affords a simpler fabrication process as compared with the formation and use of the grid pattern reinforcing layer.

An important advantage of the expandable structural member of the present invention is that the structural member may be formed in a continuous processing manner. This represents a significant improvement over prior art honeycomb panels which require careful batch processing to form shaped articles. Generally, the structural members of the present invention are prepared by applying adhesive and/or the foamable polymer composition to the reinforcing layer and/or the outer skin members and then laminating the layers in a set of nip rollers. Once the intermittent bonds between the reinforcing layer and the respective outer skin members are formed, the unexpanded structure may be handled much like sheet metal, i.e. it may be coiled, brake-formed, roll formed, stamped and the like. Severe forming operations such as drawing and ironing may or may not be feasible, particularly depending on the thickness of the expandable structural member and the thickness of the structural member in its expanded form. Once the final desired shape of the structural member has been achieved, the structural member can then be expanded by heating to the temperature required for activation of the foaming agent in the foamable polymer composition. As will be apparent, if flat, cut-to-length panels are desired, and no post-forming processing is required, expansion of the structural member may be achieved in-line with the lamination process.

Figures 6, 8, 9:
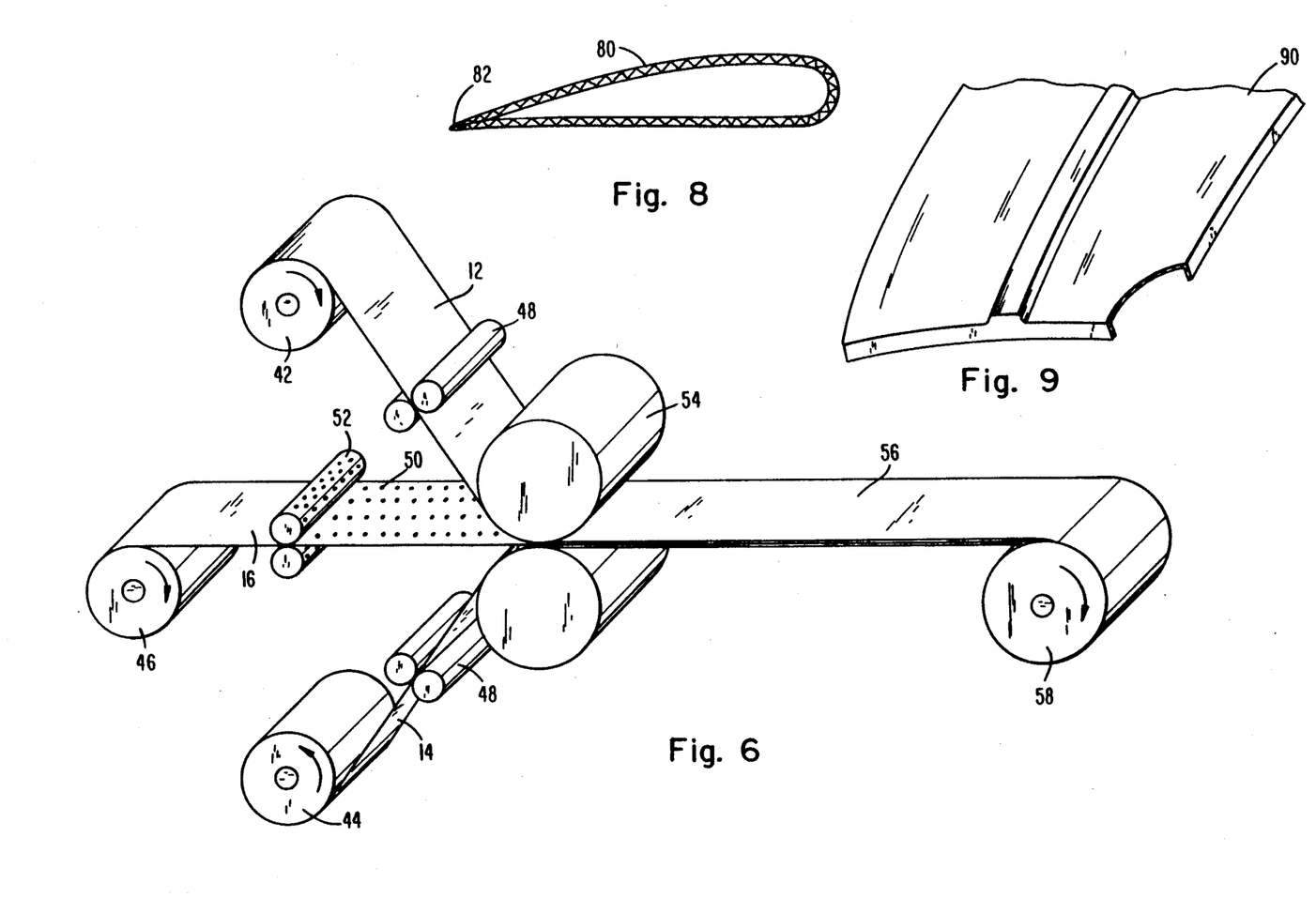
FIG. 6 is a schematic diagram of a continuous processing method for forming the structural member of the present invention.
FIG. 8 is a schematic cross sectional view of an airfoil type structural member formed from the expandable structural member of the present invention.
FIG. 9 is a schematic partial cross sectional view of an automobile hood structural member formed from the expandable structural member of the present invention.

FIG. 6 sets forth a schematic diagram of a continuous forming process of the present expandable structural member. With reference to FIG. 6, outer skin member 12, outer skin member 14 and reinforcing layer 16 are simultaneously pulled from coils 42, 44 and 46, respectively, on unwinds. The outer skin members are coated on their inner surfaces with a continuous layer of a foamable polymer composition comprising, for example, an unsaturated polyester, an azodicarbonamide foaming agent and a benzoyl peroxide initiator. In the schematic diagram of FIG. 6, the foamable polymer composition is applied to the inner surface of each of the outer skin members by means of a roll coater 48. It will be apparent that spray means or extrusion means may alternatively be employed to apply the foamable polymer composition to the respective surfaces of the outer skin members.

As further shown in FIG. 6, the reinforcing layer 16 is provided with a patterned coating of a chemical crosslinking promoter 50 for crosslinking the polymer contained in the foamable polymer composition in the selected pattern to thereby form the desired intermittent bonding between the reinforcing layer and the outer skin members. The promoter is shown in FIG. 6 as being applied by a roll coater 52 although other coating means such as spray means or extrusion means may alternatively be applied for coating the reinforcing layer. A suitable promoter for crosslinking the unsaturated polyester comprises diethylaniline or dimethylaniline. The patterns of promoter coated on the respective sides of the reinforcing layer are non-aligned with one another so that intermittent bonds on one surface of the reinforcing layer formed from crosslinked polymer are non-aligned with the intermittent bonds on the opposite surface of the reinforcing layer. The outer skin members of the reinforcing layer are pulled through a set of laminating rolls 54 so that the adjacent surface of the reinforcing layer and the respective outer skin member contact one another. The promoter causes decomposition of the peroxide, thereby initiating crosslinking of the polymer in the foamable polymer composition, whereby intermittent bonds are formed on each surface of the reinforcing layer with the respective outer skin member, and the intermittent bonds on one surface of the reinforcing layer are non-aligned with the intermittent bonds on the other surface of the reinforcing layer, as discussed above, in the patterns in which the promoter is coated on the reinforcing layer. The resulting laminated expandable structural member 56 may be wound into a coil 58 for subsequent handling, transport, forming and core expansion.

As will be apparent to one of ordinary skill in the art, the process of forming the expandable structural member as set forth in the schematic diagram of FIG. 6 may be considerably expanded. For example, temperature control throughout the laminating process may be desireable or necessary to control the rate of crosslinking in forming the intermittent bonds. Alternatively, if two or more polymeric components are used, for example a first polymer for use in the foamable polymer composition and a second polymer for use in an adhesive, the polymers should be applied in respective patterns with registration between the patterns being maintained in the coating processes, whereby more complex coating equipment will be required. In an alternate embodiment, it may be beneficial to seal the edges of the laminate, for example by hem-flanging the outer skin members or by locally crosslinking the polymer at the edge areas, particularly to prevent damage after lamination.

Figure 7:
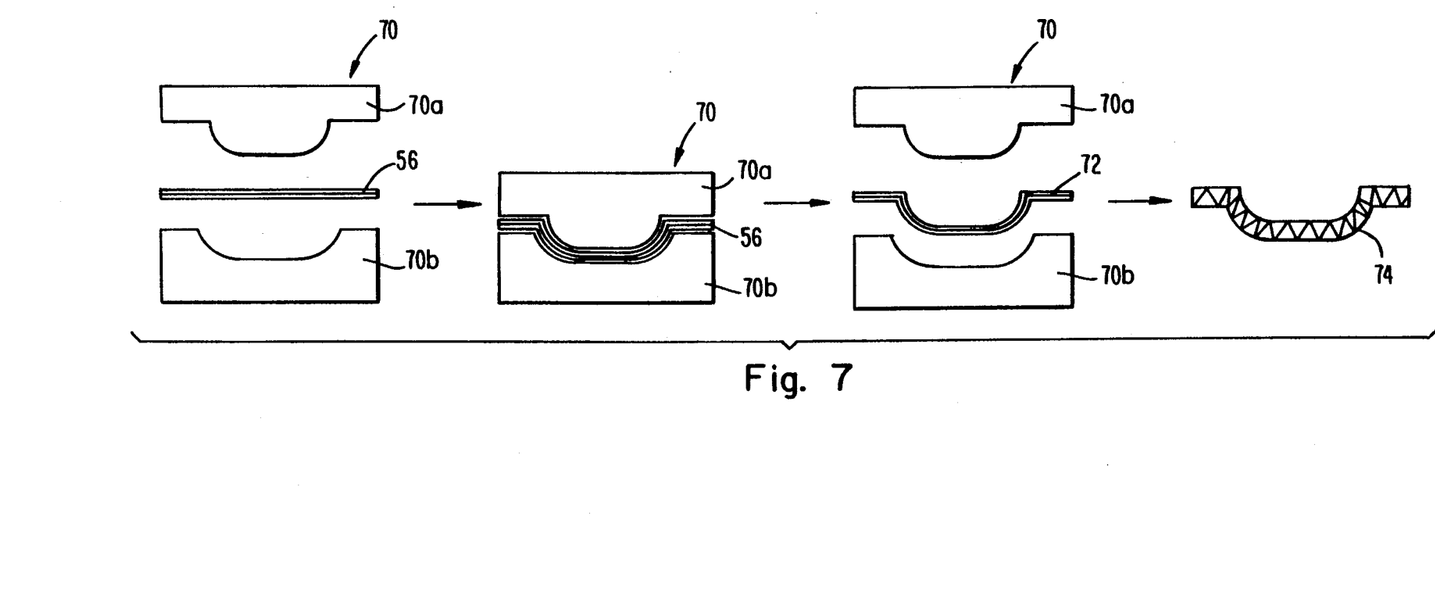
FIG. 7 is a schematic diagram of a process for forming a shaped article from the expandable structural member of the present invention.

FIG. 7 sets forth a schematic diagram of the formation of a shaped, expanded structural member using the expandable structural member of the present invention. This processing may be conveniently carried out at a location distant from the lamination processing location, thereby minimizing transportation and handling of the shaped and/or expanded member and avoiding damage thereto which occurs during handling. With reference to FIG. 7, a section of laminate 56 is positioned in a die 70 formed of die parts 70a and 70b. The die 70 forms the expandable structural member into a shaped article 72. Thus, the laminate may be formed or stamped as if it were a metal sheet, after which it is removed from the die 70 and heated to cause foaming of the foamable polymer composition, expand the outer skin members away from one another and plastically deform the reinforcing layer to provide the expanded structural member 74 as shown in FIG. 7. As will be apparent, in forming the shaped article, expansion in highly formed areas such as corners may require some type of restraint, or foaming may possibly even be locally eliminated in some areas, since simple curves will tend to straighten during expansion. Clamping may be required.

FIGS. 8 and 9 illustrate examples of shaped structural members which may be formed from the expandable structural member of the present invention. Specifically, FIG. 8 is a schematic view of a cross-section through an air foil formed from the expandable structural member of the present invention. The air foil 80 illustrates a shaped article having a simple curve. To form the air foil 80, a laminated sheet such as sheet 56 resulting from the process described in FIG. 6 is bent into the shape illustrated, and welded along its trailing edge 82. The shaped laminate is then clamped to hold its shape while heated, thereby foaming the polymer composition and expanding the laminate into the honeycomb core member shown in FIG. 8. FIG. 9 sets forth a schematic cutaway view of an automobile hood 90 formed from the expandable structural member of the present invention. Conventionally, automobile hoods are formed of two layers which are welded together for stiffness. In using the expandable structural member of the present invention, a laminate such as product 56 in FIG. 6 is die stamped to form the complex shape of the hood. The stamped article is then heated to cause polymer foaming and expansion. If necessary, the stamped article is restrained in order to retain its complex curves during expansion.

Thus, the expandable structural member of the present invention is advantageous in that it may be continuously formed as a laminate and later formed into shaped articles, with the shaped articles being heated to form a honeycomb core like member.

The preceding descriptions are set forth to illustrate specific embodiments of the invention and are not intended to limit the scope of the structural members of the present invention. Additional embodiments and advantages within the scope of the claimed invention will be apparent to one of ordinary skill in the art.

What is claimed is:

1. An expandable structural member, comprising (a) two outer skin members, (b) a plastically deformable reinforcing layer arranged between the two outer skin members, each adjacent surface of the reinforcing layer and the respective outer skin member contacting one another and being intermittently bonded to one another, the intermittent bonds on one surface of the reinforcing layer being nonaligned with the intermittent bonds on the other surface of the reinforcing layer, and (c) a foamable polymer composition coated on at least one of each adjacent surface of the reinforcing layer and the respective outer skin member, the foamable polymer composition being foamable by application of heat to the structural member, and the foamed polymer resulting from application of heat to the structural member expanding the outer skin members from contact with the reinforcing layer at nonbonded areas and plastically deforming the reinforcing layer into a three dimensional reinforcing configuration.

2. An expandable structural member as defined by claim 1, wherein the outer skin members are formed of metal.

3. An expandable structural member as defined by claim 1, wherein the outer skin members are formed of aluminum.

4. An expandable structural member as defined by claim 1, wherein the outer skin members are formed of aluminum alloy.

5. An expandable structural member as defined by claim 1, wherein the outer skin members are formed of a polymer.

6. An expandable structural member as defined by claim 1, wherein the reinforcing layer is in the form of a grid pattern and intersecting points of the grid pattern are bonded to an adjacent surface of the respective outer skin member.

7. An expandable structural member as defined by claim 6, wherein the grid pattern forms five sided, three dimensional truss structures when plastically deformed by the foamed polymer.

8. An expandable structural member as defined by claim 6, wherein the grid pattern forms four sided, three dimensional truss structures when plastically deformed by the foamed polymer.

9. An expandable structural member as defined by claim 6, wherein the grid pattern forms six sided, three dimensional truss structures when plastically deformed by the foamed polymer.

10. An expandable structural member as defined by claim 1, wherein the reinforcing layer is in the form of a continuous sheet.

11. An expandable structural member as defined by claim 1, wherein the reinforcing layer is formed of an aluminum alloy.

12. An expandable structural member as defined by claim 1, wherein the reinforcing layer is formed of a polymer.

13. An expandable structural member as defined by claim 12, wherein the reinforcing layer is formed of a polyalkylene terephthalate.

14. An expandable structural member as defined by claim 1, wherein the reinforcing layer and the outer skin members are intermittently bonded to one another by means of an adhesive.

15. An expandable structural member as defined by claim 14, wherein the adhesive comprises an epoxy adhesive.

16. An expandable structural member as defined by claim 1, wherein the reinforcing layer and the outer skin members are intermittently bonded to one another by selectively curing the polymer composition at areas where the bonds are desired.

17. An expandable structural member as defined by claim 1, wherein the foamable polymer composition comprises a foamable polymer and a heat-activated foaming agent for the polymer.

18. An expandable structural member as defined by claim 17, wherein the foamable polymer is selected from the group consisting of unsaturated polyesters, polyolefins, polyvinyl chlorides, polyalkylene terephthalates, polyphenylene ethers and polystyrenes.

19. An expandable structural member as defined by claim 18, wherein the foamable polymer comprises an unsaturated polyester.

20. An expandable structural member as defined by claim 17, wherein the foaming agent is selected from azodicarbonamide and toluene sulfonyl semicarbizide.

21. An expandable structural member as defined by claim 17, wherein the polymer composition further includes a crosslinking agent for the foamable polymer.

22. An expandable structural member as defined by claim 1, wherein the structural member has a thickness of from about 0.02 to about 0.10 inches.

23. An expandable structural member as defined by claim 1, wherein the structural member is expandable to a thickness of from about 0.10 to about 0.50 inches.

24. A method of forming a honeycomb-reinforced structural member, comprising (a) providing an expandable member comprising (i) two outer skin members, (ii) a plastically deformable reinforcing layer arranged between the two outer skin members, each adjacent surface of the reinforcing layer and the respective outer skin member contacting one another and being intermittently bonded to one another, the intermittent bonds on one surface of the reinforcing layer being nonaligned with the intermittent bonds on the other surface of the reinforcing layer, and (iii) a foamable polymer composition coated on at least one of each adjacent surface of the reinforcing layer and the respective outer skin member, the foamable polymer composition being foamable by application of heat to the expandable member, and (b) applying heat to the expandable member to foam the foamable polymer composition, expand the outer skin members from contact with the reinforcing layer at nonbonded areas and plastically deform the reinforcing layer into a three dimensional honeycomb reinforcing configuration.

25. A method as defined by claim 24, wherein the expandable member is provided in the form of a sheet, and further wherein the sheet is formed into a shaped article prior to the application of heat thereto.

26. A method as defined by claim 25, wherein curved portions of the shaped article are restrained during the heat application step.

27. A method as defined by claim 25, wherein heat is applied to the expandable member only in non-curved portions of the shaped article.

28. A method as defined by claim 24, wherein the foamable polymer composition is coated on the surfaces of the outer skin members which are adjacent the reinforcing layer.

29. A method as defined by claim 24, wherein the foamable polymer composition is coated on the surfaces of the reinforcing layer.

30. A method of forming a honeycomb-reinforced structural member, comprising (a) providing two outer skin members and a plastically deformable reinforcing layer arranged between the two outer skin members, each adjacent surface of the reinforcing layer and the respective outer skin member contacting one another; (b) intermittently bonding each adjacent surface of the reinforcing layer and the respective outer skin member to one another, the intermittent bonds on one surface of the reinforcing layer being nonaligned with the intermittent bonds on the other surface of the reinforcing layer; (c) coating a foamable polymer composition on at least one of each adjacent surface of the reinforcing layer and the respective outer skin member, the foamable polymer composition being foamable by application of heat to the respective outer skin member; and (d) applying heat to the outer skin members to foam the foamable polymer composition, expand the outer skin members from contact with the reinforcing layer at nonbonded areas and plastically deform the reinforcing layer into a three dimensional honeycomb reinforcing configuration.

31. A method as defined by claim 30, wherein the reinforcing layer and the outer skin members are intermittently bonded to one another by means of an adhesive.

32. A method as defined by claim 30, wherein the reinforcing layer and the outer skin members are intermittently bonded to one another by selectively curing the polymer composition at areas where the bonds are desired.

33. A method as defined by claim 30, wherein the outer skin members and the reinforcing layer are provided in the form of a sheet, and further wherein the sheet is formed into a shaped article prior to the application of heat thereto.

34. A method as defined by claim 33, wherein curved portions of the shaped article are restrained during the heat application step.

35. A method as defined by claim 33, wherein heat is applied to the shaped article only in non-curved portions of the shaped article.

36. A method as defined by claim 30, wherein the foamable polymer composition is coated on the surfaces of the outer skin members which are adjacent the reinforcing layer.

37. A method as defined by claim 30, wherein the foamable polymer composition is coated on the surfaces of the reinforcing layer.

* * * * *